United States Patent [19]
Sturtevant et al.

[11] 4,027,841
[45] June 7, 1977

[54] REPRODUCIBLE MOUNTING OF PREALIGNED OPTICAL ASSEMBLIES

[75] Inventors: Alfred H. Sturtevant, Palo Alto; Robert L. Trumbull, Mountain View, both of Calif.

[73] Assignee: Varian Associates, Palo Alto, Calif.

[22] Filed: Apr. 12, 1976

[21] Appl. No.: 676,095

[52] U.S. Cl. .................................. 248/19; 248/346
[51] Int. Cl.² ....................................... F16M 11/04
[58] Field of Search .................. 248/1, 23, 19, 469, 248/163, 178, 177, 179, 346; 292/290, 292, 256.71, 256

Primary Examiner—Marion Parsons, Jr.
Attorney, Agent, or Firm—Stanley Z. Cole; Gerald M. Fisher; John J. Morrissey

[57] ABSTRACT

A reproducible mounting for use in conjunction with prealigned optional assemblies. The mounting comprises a base member and a mating member attached thereto by fastening means cooperating with first, second and third noncollinearly disposed mounting holes whereby all six degrees of freedom between the base and the mating member are eliminating.

21 Claims, 11 Drawing Figures

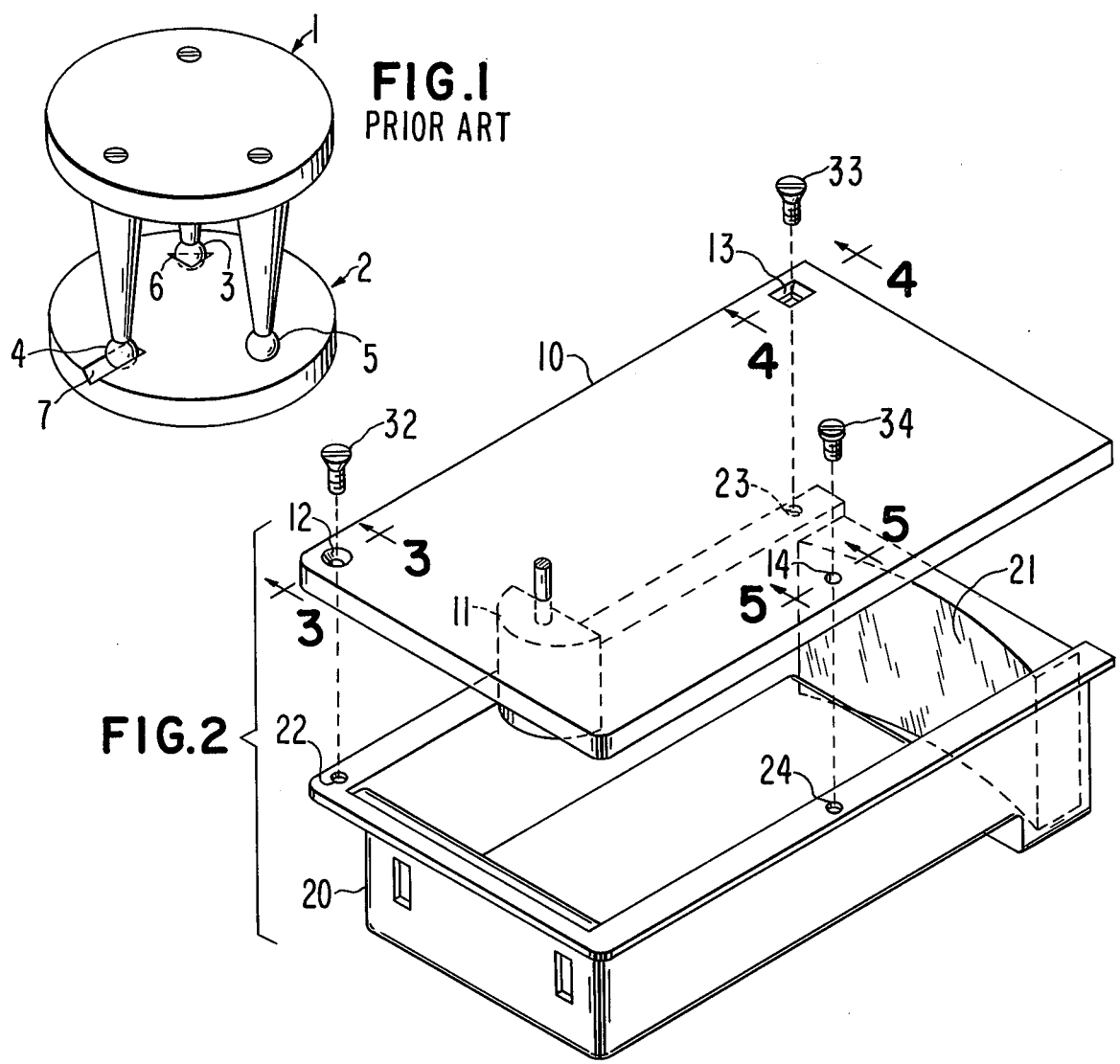
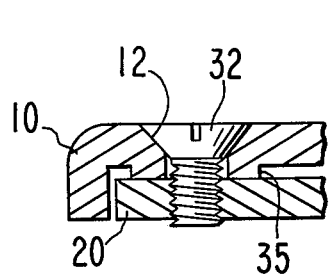
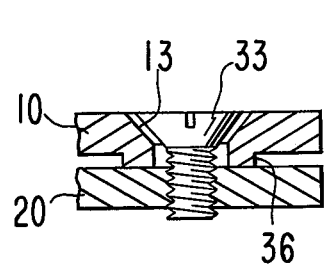
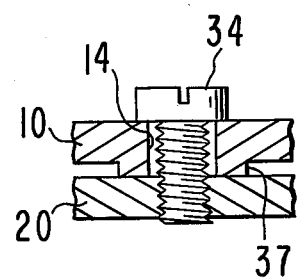

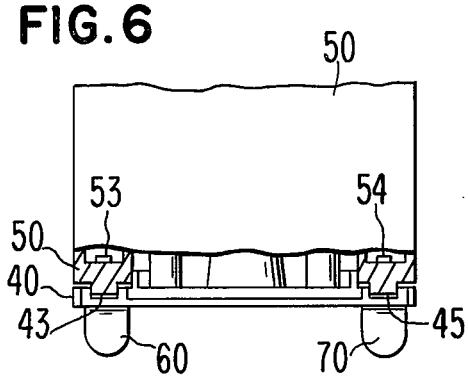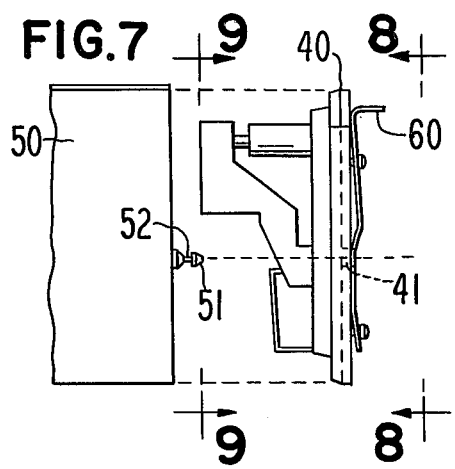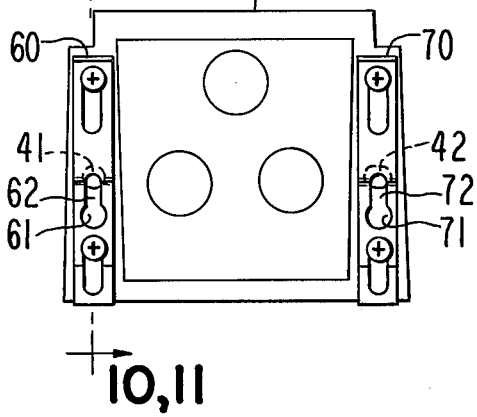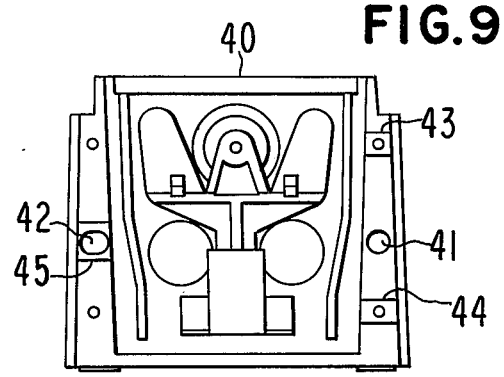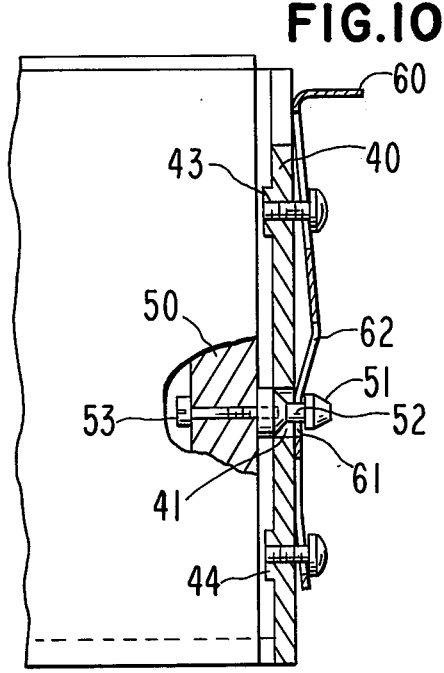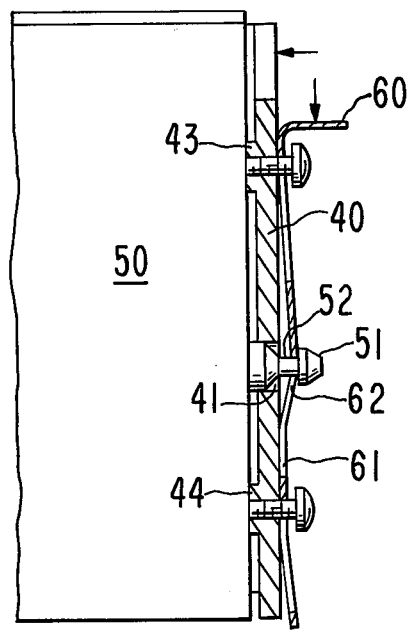

REPRODUCIBLE MOUNTING OF PREALIGNED OPTICAL ASSEMBLIES

BACKGROUND OF THE INVENTION

1. Field of the Invention

This invention is a further development of the principle of kinematical design, and is particularly applicable in providing reproducible mounting and/or interchange of prealigned optical assemblies.

2. Prior Art

According to the principal of kinematical design, a body must have at least $(6 - n)$ points of contact with a second reference body if it is to have only $n$ degrees of freedom relative to the reference body.

Consider, for example, a tripod 1 resting on a plate 2, as shown in FIG. 1. At the extremity of each of the legs of the tripod 1 is a sphere. The three spheres are represented by the reference numbers 3, 4 and 5, respectively. The sphere 3 rests in a trihedral cavity 6 in the surface of the plate 2, while the sphere 4 rests in a V-groove 7 in the surface of the plate 2. The sphere 5 rests on the surface of the plate 2. There are only three points of contact between the sphere 3 and the plate 2. The constraints provided by these three points of contact prevent translational motion of tripod 1 with respect to the plate 2. However, there remain 3 degrees of freedom of rotation for the sphere 3 relative to the plate 2. There are only two points of contact between the sphere 4 and the plate 2. The constraints provided by these two points of contact prevent rotation of the tripod 1 about any axis in a plane perpendicular to the plate 2, but leave 1 degree of rotational freedom about the axis joining the spheres 3 and 4. There is only one point of contact between the sphere 5 and the plate 2. The constraint provided by this point of contact removes the final degree of freedom.

If a first body is mounted upon a second body such that all 6 degrees of freedom are eliminated, the position of the first body relative to the second body is completely specified. If additional constraints are imposed, stresses are induced which result in deterioration of the reproducibility of the mounting. In other words, when the mounting technique assures that six and only six positional constraints are introduced, the mounting is reproducible. The principle of kinematical design is discussed in greater detail in, e.g., *Procedures in Experimental Physics*, Prentice Hall, 1938, pp. 585–590, and in *The Design and Use of Accurate Instruments*, Dover, 1954, pp. 145–179.

SUMMARY OF THE INVENTION

It is an object of this invention to provide reproducible mounting for one body relative to another. Particular use of this invention can be made in optical applications.

In the embodiments disclosed herein, a cover member supports a first optical element that is to be precisely aligned with respect to a second optical element supported on a base member. In one embodiment, the cover member is reproducibly mounted on top of the base member by three screws, each screw passing through a mounting hole on the cover member and through a matching hole on the base member. A raised area around each mounting hole on the underside of the cover member restricts contact between the cover and base members to the three points in the immediate vicinity of the screws. At one mounting hole, which is a standard countersunk hole, 3 degrees of freedom of the cover member relative to the base member are constrained. At a second mounting hole, which is similar to the first mounting hole but slightly elongated along the line connecting it to the first mounting hole, 2 degrees of freedom are constrained. At the third mounting hole, which is of clearance size and located off the line joining the other two holes, the final degree of freedom is constrained.

In another embodiment, the cover and base members present vertically oriented opposing surfaces to each other. Two pins of precision diameter protrude from the base member, and two holes on the cover member are disposed to receive these pins. Affixed to the side of the cover member facing away from the base member are two slideable spring clips, each spring clip having a keyhole-shaped cutout. To mount the cover member against the base member, each spring clip is slid to a position at which the narrow portion of its keyhole-shaped cutout firmly engages a slotted portion on the pin received therein. The spring clips exert compressional forces which urge the pins away from the base member, thereby forcing the cover member against the base member. Three slightly raised pads or bosses are noncollinearly disposed on the surface of the cover member to restrict contact between the cover and base members to only three points. These three contact points determine the translational position of the cover member relative to the base member in the direction perpendicular to the plane defined by the contact members. One of the holes is configured to allow rotation of the cover member relative to the base member about the axis of the pin received therein, but to preclude translation of the cover member relative to the base member in the plane defined by the three contact points. This design requirement is accomplished by configuring this first hole to provide a tight fit in all directions in the plane defined by the three contact points for the pin received therein. The second hole is configured to preclude rotation of the cover member relative to the base member about the axis of the pin that is received in the first hole. This design requirement is most efficiently accomplished by configuring the second hole to provide a tight fit for the pin received therein in the direction perpendicular to the line joining both holes, but to be elongated along the line joining both holes.

BRIEF DESCRIPTION OF THE DRAWING

FIG. 1 is a perspective view of an assembly known to the prior art, which illustrates the principle of kinematical design.

FIG. 2 is an exploded view of two members kinematically mounted according to a particular embodiment of this invention.

FIG. 3 is a fragmentary view along line 3—3 of FIG. 2.

FIG. 4 is a fragmentary view along line 4—4 of FIG. 2.

FIG. 5 is a fragmentary view along line 5—5 of FIG. 2.

FIG. 6 is a top view of two members kinematically mounted according to a different embodiment of this invention.

FIG. 7 is an exploded view of the two kinematically mounted members shown in FIG. 6.

FIG. 8 is a view along line 8—8 of FIG. 7.

FIG. 9 is a view along line 9—9 of FIG. 7.

FIG. 10 is a view along line 10,11 —10,11 of FIG. 8 showing a spring clip according to this invention in an open position.

FIG. 11 is a view along line 10,11 —10,11 of FIG. 8 showing a spring clip according to this invention in a closed position.

DESCRIPTION OF PREFERRED EMBODIMENTS

FIG. 2 shows an exploded view of a cover member 10 to be kinematically mounted on a base member 20. The cover member 10 and the base member 20 may be, for example, structural components of a monochromator assembly, with a diffraction grating 11 being rotatably mounted on the cover member 10 and a collimating mirror 21 being mounted on the base member 20. It is critically important in many optical applications that the support member for one particular optical element be reproducibly mounted with respect to the support element for another optical element. Such reproducible, or "kinematical," mounting is provided in an exceptionally efficient and economical way by the technique shown in FIG. 2.

The cover member 10 and the base member 20 are each provided with a set of three non-colinearly disposed holes. As seen in FIG. 2, the holes 22, 23 and 24 on the base member 20 are located to match the locations of holes 12, 13 and 14 on the cover member 10, when the cover member 10 is mounted upon the base member 20. Standard commercially available screws 32, 33 and 34 are inserted into the matching pairs of holes 12 and 22, 13 and 23, and 14 and 24, respectively, in order to attach the cover member 10 to the base member 20.

Kinematical mounting of the cover member 10 upon the base member 20 is achieved by configuring the various screws and holes so as to specify the location of the cover member 10 with respect to the base member 20 in terms of six and only six constraints imposed upon the degrees of freedom of one member relative to the other. As shown in detail in FIG. 3, the hole 12 is a standard countersunk hole that accepts the conical underside of the screw 32, which is a conventional flat-head screw. The hole 13 is a similar countersunk hole, but is slightly elongated in the direction of the line connecting holes 12 and 13. The screw 33 is a conventional flat-head screw of the same type as the screw 32. The hole 13 accepts the conical underside of the screw 33 to form a tight fit in some one particular direction other than along the line joining holes 12 and 13. As seen in FIG. 2, the direction of tight fit for the screw 33 in hole 13 is in the direction in the plane of the cover member 10 perpendicular to the line joining the holes 12 and 13, while (as seen in detail in FIG. 4) the screw 33 is not at all constrained by the inside perimeter of the hole 13 in the direction along the line joining the holes 12 and 13. The hole 14, as seen in greater detail in FIG. 5, is merely of clearance size for a conventional binder-head screw 34 having a flat underside. On the under surface of the cover member 10, facing the upper surface of the base member 20, small raised areas 35, 36 and 37 are provided around the periphery of the holes 12, 13 and 14, respectively, as shown in FIGS. 3, 4 and 5, respectively. These small raised areas serve to restrict contact between the cover member 10 and the base member 20 to the immediate vicinity of the screws 32, 33 and 34. Each contact area provided by the raised areas 35, 36 and 37 has dimensions that are small relative to the distance between any two of these contact areas, so that in terms of order of magnitude, the cover member 10 may be said to contact the base member 20 at three points.

When all the screws 12, 13 and 14 are tightened, contact between the base member 20 and the cover member 10 at the raised areas 35, 36 and 37 is assured. In addition, because the conical underside of the screw 32 is tightly seated in the hole 12, all translational motions of one member relative to the other are precluded. The screw 33 prevents relative rotation of one member relative to the other about the axis of the screw 32. The screw 34, in combination with the screws 32 and 33, prevents relative rotation of the members about the axis joining the holes 12 and 13. Since the areas of contact between the cover member 10 and the base member 20 are restricted to the immediate vicinity of the clamping screws 32, 33 and 34, a minimal amount of bending stress is introduced. Thus, both the cover member 10 and the base member 20 remain undistorted after the cover member 10 has been mounted upon the base member 20.

From the standpoint of fabrication, only modest precision is required with respect to the configuration and positioning of any of the three holes 12, 13 and 14, in order to achieve a high degree of kinematical assembly. Since the mounting forces are achieved with screws, rather than, e.g., springs, a very high degree of rigidity is achieved.

An alternative embodiment of this invention is shown in FIGS. 6 through 11. FIG. 7 shows an exploded view of a vertically oriented cover member 40 positioned for mounting upon a base member 50. FIG. 6 shows a top view of the embodiment of FIG. 7 after mounting has been accomplished.

Two mounting posts, which are precision diameter pins 51 and a similar pin not shown, project from the base member 50. As shown in FIG. 6, the mounting posts are secured, respectively, to the base member 50 by screws 53 and 54. The attachment of the mounting pin 51 to the base member 50 by means of the screw 53 is shown in greater detail in FIG. 10.

The cover member 40 may serve as a supporting structure for, e.g., an optical component which must be precisely aligned with a corresponding optical component mounted within the base member 50. The cover member 40 has holes 41 and 42 positioned to receive the mounting pins when mounting of the assembly has been completed. Pin 51 is provided with a grooved or recessed portion 52, and the other mounting pin is similarly configured. On the surface of the cover member 40 facing away from the base member 50, two slideable spring clips 60 and 70 are provided. The spring clips 60 and 70 have holes 61 and 71, respectively, to receive the mounting pins 51 and the unnumbered pin, respectively, when the cover member 40 is put in contact with the base member 50. The holes 61 and 71 are of keyhole shape, having narrow portions 62 and 72, respectively, as seen in FIG. 8, The spring clips 60 and 70 are slideably mounted upon the cover member 40 from a fully "open" position at which the spring clips exert no forces upon the mounting pins received within the holes 61 and 71, to a fully "closed" position at which the narrow portions 62 and 72 of the holes 61 and 71, respectively, engage the recessed or grooved portions of the respective mounting pins.

FIG. 10 shows the spring clip 60 in the fully open position at which no part of the spring clip 60 bears against the pin 51. FIG. 11 shows the spring clip 60 in the fully closed position, at which the narrow portion 62 of the keyhole-shaped cutout 61 engages the grooved portion 52 of the pin 51. In the fully closed, or "locked," position, each spring clip 60 and 70 exerts a force against a shoulder of one of the mounting pins, thereby urging the pins away from the base member 50. Consequently, the cover member 40 to which the spring clips 60 and 70 are attached is held in contact with the base member 50.

Kinematical mounting of the cover member 40 upon the base member 50 is provided by designing the relative configurations of these two members so as to specify their location with respect to each other in terms of six and only six constraints imposed upon the degrees of freedom of one member relative to the other member.

The cover member 40 and the base member 50 are configured so that when the spring clips 60 and 70 are in the locked position, the cover member 40 and the base member 50 are in contact with each other at three noncollinear contact regions, where the dimensions of each contact region is small relative to the distance between any two of the contact regions. These three contact regions precisely determine the translational position of one member relative to the other member in the direction normal to the plane defined by these three regions. In other words, the area of these contact regions is sufficiently small so that the cover member 40 may be said to contact the base member 50 at three points for purposes of kinematical analysis.

In the embodiment shown in FIGS. 6 through 11, the three contact regions 43, 44 and 45 are raised areas or bosses located on the inside of the cover member 40 facing the base member 50 underneath the tracks of the slideable spring clips 60 and 70. For the purpose of kinematical analysis, it is only necessary that the raised areas 43, 44 and 45 be noncollinear. The precise positioning of these contact areas 43, 44 and 45 on the inside surface of the cover member 40 is not critical. A particularly efficient design for the location of the contact areas 43, 44 and 45 is shown in FIG. 9, where the raised areas 43 and 44 are seen to lie under the track of the spring clip 60, one on either side of the hole 41, and the raised area 45 is shown under the track of the spring clip 70 as a peripheral region surrounding the hole 72.

The hole 41 provides tight clearance for the pin 51 in all directions in the plane defined by the three contact areas 43, 44 and 45, therby permitting rotation of the cover member 40 about the axis of the pin 51 but precluding translation of the cover member relative to the base member in the plane defined by the three contact regions 43, 44 and 45. The hole 42 is configured to provide tight clearance for the other mounting pin in the direction perpendicular to the line connecting the holes 41 and 42. In the preferred embodiment shown in FIG. 9, the hole 42 is elongated in the direction of the line joining the holes 41 and 42. As the angular displacement of the direction of elongation of the hole 42 with respect to the line joining the holes 41 and 42 increases, the ability of the mounting pin received therein to restrict rotational motion about the axis of the other mounting pin 51 is decreased. The hole 42 in combination with the mounting pin received therein precludes rotation of the cover member 40 relative to the base member 50 about the axis through the mounting pin 51 in the hole 41, thereby imposing six and only six constraints on the degrees of freedom of one member relative to the other member.

The spring clip mounting technique of this embodiment provides rapid mounting and demounting, and rapid interchange, of preadjusted optical assemblies. The spring clips 60 and 70 may be readily fabricated to remain in the open position due to friction with, e.g., one of the retaining screws used to affix the spring clips to the cover member 40, until the spring clips are manually depressed to the locked position.

Each of the embodiments disclosed herein involves a particular application of the principle of kinematical design. It is recognized that minor deviations from the precise structural details of these embodiments are possible, and such modifications are deemed to be within the scope of the present invention, which is limited only by the following claims.

What is claimed is:

1. An assembly comprising a base member and a mating member; said base member having first, second and third noncollinearly disposed mounting holes; said mating member having first, second and third matching holes; first, second and third locating means; said mating member being mountable upon said base member such that said first locating means passes through said first mounting hole and said first matching hole, said second locating means passes through said second mounting hole and said second matching hole, and said third locating means passes through said third mounting hole and said third matching hole; said base and mating members being configured to be in contact with each other, when assembled, at three noncollinear areas, the dimensions of said three contact areas being small relative to the distance between any two of said contact areas; said first mounting and matching holes being configured to preclude translational motion of said mating member relative to said base member in a direction parallel to a plane defined by said three small contact areas when said first locating means passes through said first mounting and matching holes; said second mounting and matching holes being configured to allow rotational motion of said mating member relative to said base member only about a lne joining said first and second mounting holes when said second locating means passes through said second mounting and matching holes; said third mounting and matching holes being configured to preclude rotational motion of said mating member relative to said base member about said line joining said first and second mounting holes when said third locating means passes through said third mounting and matching holes.

2. The assembly of claim 1 wherein said first, second and third locating means also serve to secure said mating member to said base member.

3. The assembly of claim 2 wherein said first locating means is elongate, with first and second end portions, the extremity of said first end portion having a cross-sectional dimension that is greater than the greatest cross-sectional dimension of said first matching hole.

4. The assembly of claim 3 wherein said second end portion of said first locating means is fixedly secured to said base member.

5. The assembly of claim 3 wherein said first matching hole and said first end portion of said first locating means have circular cross-sections.

6. The assembly of claim 1 wherein said first locating means is a screw having a head with a conical underside, and wherein said first matching hole is a hole configured to receive said conical underside.

7. The assembly of claim 3 wherein said first locating means is a screw, and wherein said first end portion is the head of said screw, said screw head having a conical underside, and wherein said first matching hole is a countersunk hole configured to receive said conical underside of said screw head.

8. The assembly of claim 7 wherein said second locating means is a screw having a head with a conical underside, and wherein said second matching hole is elongate along a line joining said first and second matching holes and has a V-shaped cross section in a plane perpendicular to said line joining said first and second matching holes.

9. The assembly of claim 8 wherein said third locating means is a screw having a head with a flat underside, and wherein said third matching hole has a bore, the cross-sectional diameter of said bore being smaller than the head of said screw but large enough to receive the body of said screw therewithin without the body of said screw touching said bore.

10. The assembly of claim 9 wherein said first, second and third locating means are threadably received in said first, second and third mounting holes, respectively.

11. The assembly of claim 1 wherein each of said contact areas between said base member and said mating member is located in the vicinity of a particular one of said matching holes.

12. The assembly of claim 11 wherein at least one of said contact areas between said base member and said mating member is formed by a raised portion of said mating member surrounding a particular one of said matching holes, a surface on said raised portion of said mating member being in contact with a corresponding surface portion of said base member.

13. The assembly of claim 11 wherein said first, second and third locating means secure said mating member to said base member.

14. An assembly comprising a base member and a mating member, first and second posts projecting from said base member, said mating member having first and second holes for receiving respectively said first and second posts, first and second spring clips affixed to said mating member, said first and second spring clips being slideable to respective locked positions at which, when said posts are received in said holes, said first and second posts are respectively urged by said first and second spring clips away from said base member thereby urging said mating member toward said base member, said base and mating members being configured so that when said spring clips are in said locked positions said base and mating members are in contact with each other at three noncollinear contact regions, the dimensions of each contact region being small relative to the distance between any two of said contact regions, said three contact regions determining the translational position of said mating member relative to said base member in a direction normal to the plane defined by said three contact regions, said first hole being configured to allow rotation of said mating member relative to said base member about the axis of said first post and to preclude translation of said mating member relative to said base member in said plane defined by said three contact regions when said posts are received in said holes, said second hole being configured to preclude rotation of said mating member relative to said base member about the axis of said first post.

15. The assembly of claim 14 wherein each of said first and second spring clips has a key-hole shaped cut-out region, said cut-out region comprising a generally round wide portion and an elongate narrow portion, said wide and narrow portions being contiguous, said wide portion of said cut-out region having a dimension greater than the cross-sectional dimension of one of said posts, each of said posts having a recessed portion, said narrow portion of said cut-out region having a dimension less than the cross-sectional dimension of one of said posts but greater than the cross-sectional dimension of the recessed portion of said one post, said spring clips being slidable from an unlocked position at which each of said posts is received within the wide portion of the cut-out region of a respective one of said spring clips to a locked position at which the recessed portion of each of said posts is received within the narrow portion of the cut-out region of said respective one of said spring clips.

16. The assembly of claim 14 wherein at least one of said three noncollinear contact regions between said base and mating members is formed by a raised portion on the mating member, a surface on said raised portion on said mating member being in contact with a corresponding surface portion of said base member when said spring clips are in said respective locked positions.

17. The assembly of claim 16 wherein said three noncollinear contact regions are formed by raised portions on said mating member.

18. The assembly of claim 17 wherein two of said raised portions on said mating member are disposed on a line parallel to the axis of one of said spring clips, said two raised portions being on the surface of said mating member directly opposite the surface to which said one spring clip is affixed, and where the third one of said raised portions on said mating member is disposed on the surface of said mating member directly opposite the surface to which the other of said two spring clips is attached.

19. The assembly of claim 18 wherein said third one of said raised portions on said mating member circumferentially surrounds one of said holes in said mating member.

20. The assembly of claim 14 wherein said first post is substantially cylindrical and said first hole is configured to receive said first post such that translational motion of said first post in a radial direction within the bore of said first hole is substantially precluded, said first post contacting the bore of said first hole such that restraints on the angular motion of said first post relative to said first hole are substantially precluded.

21. The assembly of claim 14 wherein said second post is substantially cylindrical and said second hole is elongate along a line joining said first and second holes, said second hole being configured to receive said second post such that translational motion of said second post in the plane defined by said three contact regions is substantially precluded except in the direction of elongation of said second hole, said second post contacting the bore of said second hole such that restraints on the angular motion of said second post relative to said second hole are substantially precluded.

* * * * *